United States Patent [19]

Toelke et al.

[11] Patent Number: 4,881,680
[45] Date of Patent: Nov. 21, 1989

[54] PROCESS FOR THE PRODUCTION OF A COMPOSITE CAMSHAFT

[75] Inventors: Peter Toelke, Diessenhofen; Walter Greulich, Uhwiesen, both of Switzerland

[73] Assignee: Georg Fischer AG, Schaffhausen, Switzerland

[21] Appl. No.: 190,930

[22] Filed: May 6, 1988

[30] Foreign Application Priority Data

May 7, 1987 [CH] Switzerland .................. 738/87

[51] Int. Cl.$^4$ ............................................. B23K 31/00
[52] U.S. Cl. ................................ 228/182; 29/156.4 R; 74/567
[58] Field of Search ............... 228/182, 102, 103; 29/156.4 R, 6, 428, 792, 464; 74/567

[56] References Cited

U.S. PATENT DOCUMENTS

| | | | |
|---|---|---|---|
| 4,144,492 | 3/1979 | Omae et al. | 228/102 |
| 4,337,572 | 7/1982 | Takahashi et al. | 29/6 |
| 4,448,342 | 5/1984 | Abe et al. | 228/102 |

FOREIGN PATENT DOCUMENTS

| | | | |
|---|---|---|---|
| 3536296 | 3/1987 | Fed. Rep. of Germany | 74/567 |
| 54-126853 | 10/1979 | Japan | 228/182 |

Primary Examiner—M. Jordan
Attorney, Agent, or Firm—Bachman & LaPointe

[57] ABSTRACT

A process for the production of composite camshafts comprises the selective positioning of a plurality of cam elements on a camshaft and orienting the cam elements at a desired location with respect to the central axis of the shaft and thereafter securing the cam elements in place on the shaft.

6 Claims, 1 Drawing Sheet

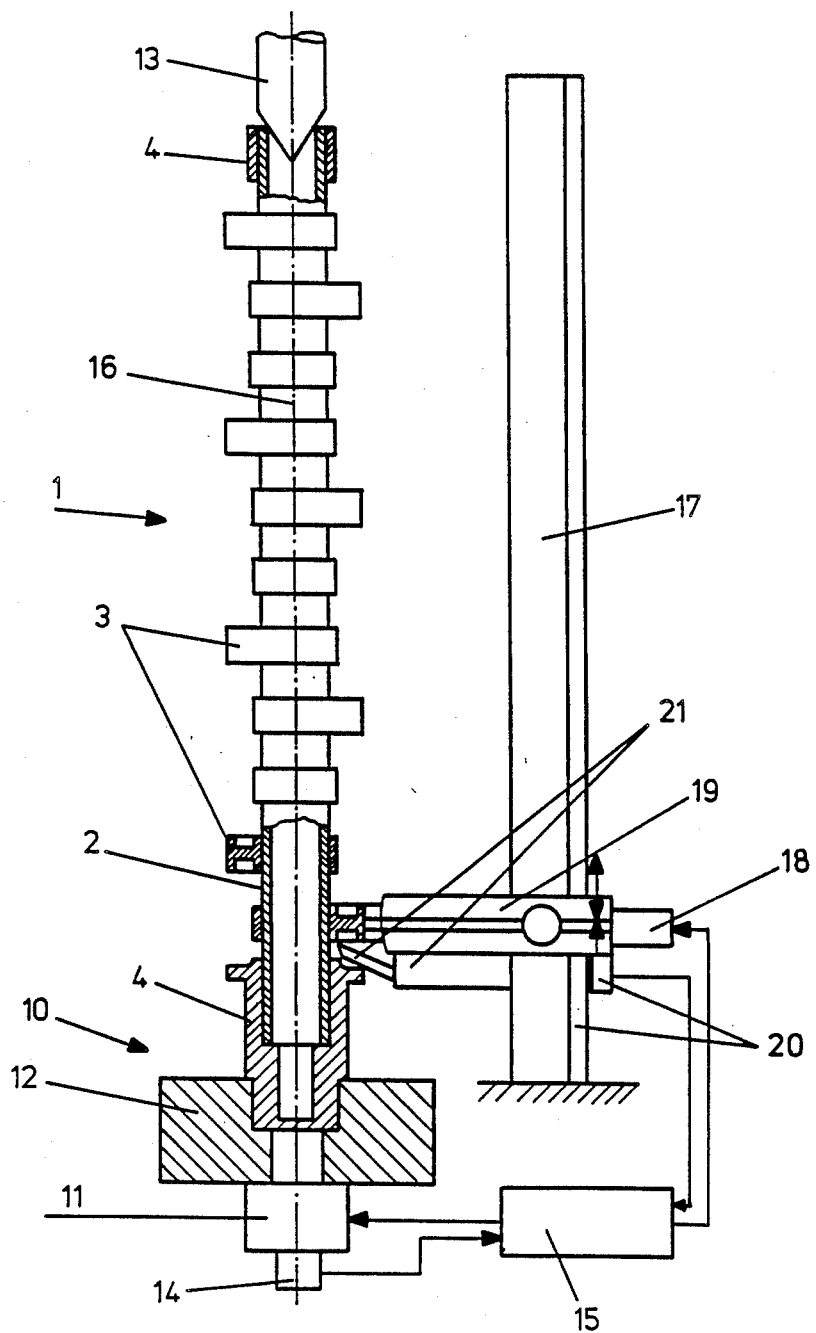

PROCESS FOR THE PRODUCTION OF A COMPOSITE CAMSHAFT

BACKGROUND OF THE INVENTION

The invention relates to a process for the production of a composite camshaft and an apparatus suitable for use in the production process.

A known process for the production of composite camshafts is disclosed in German Application No. DE-A1-3209980 wherein cam elements and bearing elements produced by sintering are fixed on a shaft by means of small pins or tubes arranged in radial bore holes. After fixing the elements in place, the camshaft is sintered at a predetermined temperature so as to allow the cam elements and bearing elements to become integrally bonded with the shaft.

The process for making the radial bore holes in the shaft, the angular position of which has to be very exact, is very laborious and requires a number of mechanical operations including an alignment of the parts during the drilling operation and also during the subsequent fixing in position operation, which is disadvantageous for economical reasons.

The object of the present invention is the development of a process for the production of a composite camshaft which makes possible a simple alignment and fixing in position of the cam elements and bearing elements on the shaft in an efficient operation. The present invention is also drawn to an apparatus for carrying out the process.

SUMMARY OF THE INVENTION

The foregoing objects are achieved by way of the process of the present invention for the production of a composite camshaft having a plurality of cam elements and a plurality of bearing elements mounted on a shaft at a desired location and a desired orientation comprising providing an elongated shaft having a longitudinal axis and an outer circumferential surface configuration, providing a plurality of cam elements and bearing elements wherein each of the cam elements and bearing elements are provided with an internal bore having a size and configuration substantially similar to the outer circumferential configuration of the shaft, positioning the plurality of cam elements and the plurality of bearing elements successively on the shaft, locating a first of one of the plurality of cam elements and the plurality of bearing elements at a desired location along the longitudinal axis of the shaft, orienting the first of one of the plurality of cam elements and the plurality of bearing elements at a desired orientation on the outer circumferential surface of the shaft with respect to the longitudinal axis thereof, fixing the first of one of the plurality of cam elements and the plurality of bearing elements on the shaft, and repeating the locating, orienting and fixing steps until all of the plurality of cam elements and bearing elements are secured on each shaft. The apparatus for carrying out the process comprises first motor means for rotatably supporting a shaft for rotation about a longitudinal axis of the shaft, gripping means mounted proximate to the shaft for selectively holding the cam elements at desired locations along the axis of the shaft, securing means associated with the gripping means for securing the selectively held cam elements to the shaft, second motor means for displacing the gripping means and the securing means along the axis of the shaft, and control means for selectively actuating the first and second motor means for locating and orienting the cam elements on the shaft.

BRIEF DESCRIPTION OF THE DRAWING

The single figure shows a diagrammatic representation of an apparatus for the automatic positioning and fixing in position of cam elements on a camshaft in accordance with the process of the present invention.

DETAILED DESCRIPTION

The apparatus has a receiving device 10 for the camshaft 1, which consists of a preferably hollow shaft 2 and cam elements 3 and bearing elements 4 arranged thereupon.

The receiving device 10 has a chucking fixture 12 which is rotatably by first motor means in the form of a rotary drive 11 and, at the other end, a tailstock with a center 13, for keeping a shaft 2 rotatably supported about axis 16. On the chucking fixture 12 there is arranged an angle of rotation measuring device 14, which is effectively connected to a microprocessor 15.

Parallel to the axis of rotation 16 there is arranged a longitudinal guide 17, on which a gripping device 19 is longitudinally displaceable by means of a second motor means or drive 18. A displacement measuring device 20 is effectively connected to the microprocessor 15. The first and second drives 11 and 18 are likewise effectively connected to the microprocessor 15.

A securing means 21 in the form of a welding or soldering device is arranged to be longitudinally displaceably together with the gripping device 19. The securing means 21 is designed for the application of at least three weld or solder points evenly distributed round the circumference on one end face of the cam elements 3. The welding or soldering device may also be arranged longitudinally displaceably on a second guide if desired, which requires a further drive and displacement measuring device.

The process for the production of the camshaft is as follows.

The cam elements 3, and if desired also the bearing elements 4, are pushed onto the shaft 2 in the desired number and sequence, where they are aligned in one direction alongside one another at one end of the shaft. The cam elements, preferably made of a hard casting, each have a bore hole which has a slight play with respect to the preferably smooth shaft, which is achieved by prior mechanical working, for example by grinding. The shaft 2, provided with the cam elements 3 and bearing elements 4 threaded on, is located in the receiving device 10 and microprocessor 15 is actuated which causes the first cam element 3 located near the free end of the shaft to be seized by the gripping device 19 and brought into the desired position on the shaft by longitudinal displacement thereof by means of the gripping device and drive 18. Thereafter, by turning of the shaft 2 by means of the rotary drive 11 the desired orientation of the cam element is accomplished.

As the welding or soldering device 21 is likewise brought into the operational position at the same time as the longitudinal displacement of the gripping device 19, the corresponding weld or solder points can be applied, for example by the extension of preferably three weding or soldering arms, to one end face of the cam element 3 for the fixing of the cam element in the correct position.

Thus, all cam elements successively or, if two having the same circumferential direction are alongside each other, two cam elements at once, are brought into the specified position and fixed there by means of a tack connection.

Once all cam elements have been fixed in position, the firm connection of the cam elements 3 to the shaft 2 is established by a circumferential weld or solder connection on at least one end face of each cam element 3. This is preferably performed in a separate welding or soldering device or by means of a welding or soldering device additional arranged in the previously described apparatus.

It is to be understood that the invention is not limited to the illustrations described and shown herein, which are deemed to be merely illustrative of the best modes of carrying out the invention, and which are susceptible of modification of form, size, arrangement of pafts and details of operation. The invention rather is intended to encompass all such modifications which are within its spirit and scope as defined by the claims.

What is claimed is:

1. A process for the production of a composite camshaft having a plurality of cam elements mounted on a shaft at a desired location and a desired orientation comprising:
   (a) providing an elongated shaft having a longitudinal axis and an outer circumferential surface configuration;
   (b) providing a plurality of cam elements wherein each of said cam elements are provided with an internal bore having a size and configuration substantially similar to the outer circumferential configuration of said shaft;
   (c) positioning said plurality of cam elements successively on said shaft;
   (d) locating said shaft in a rotary drive means for rotating sahd shaft about its longitudinal axis;
   (e) gripping one of said plurality of cam elements and locating said one cam element at a desired location along the longitudinal axis of said shaft;
   (f) rotating said shaft so as to locate said one cam element at a desired orientation on said outer circumferential surface of said shaft at said desired location along the longitudinal axis thereof;
   (g) bonding said one cam element on said shaft at said desired location and orientation;
   (h) releasing said gripping means from one cam elements; and
   (i) repeating steps (e), (f), (g) and (h) until all of said plurality of cam elements are secured on said shaft.

2. A process according to claim 1 wherein the fixing of said plurality of cam elements comprises the steps of a first tack connection followed by a circumferential connection on the shaft.

3. A process according to claim 2 wherein said connections are made by metal bonding.

4. A process according to claim 2 wherein the tack connection includes a plurality of tacks on one face of the cam elements.

5. A process according to claim 2 wherein the circumferential connection is on at least one face of the cam elements.

6. A process according to claim 1 wherein a microprocessor controls the locating, orientating and fixing steps.

* * * * *